Oct. 15, 1963   MANABU OSAWA   3,107,321
ALTERNATING CURRENT COMMUTATOR MOTOR WHICH STOPS
QUICKLY BY SELF BRAKING ACTION
Filed Dec. 5, 1960

RATIO OF IMPEDANCES
BETWEEN ARMATURE 2 AND SHUNT WINDING 3 ≅ 1:1
BETWEEN SHUNT WINDING 3 AND SERIES FIELD WINDING ≅ 7:3

MANABU OSAWA
INVENTOR.

BY *George B. Oujevolk*

ATTORNEY

United States Patent Office 3,107,321
Patented Oct. 15, 1963

3,107,321
ALTERNATING CURRENT COMMUTATOR MOTOR WHICH STOPS QUICKLY BY SELF BRAKING ACTION
Manabu Osawa, 96 2-chome Kitashinagana, Tokyo, Japan
Filed Dec. 5, 1960, Ser. No. 73,798
2 Claims. (Cl. 318—244)

This invention relates to an alternating current commutator motor of the quick stop type and has as its principal object to provide a small sized alternating current commutator motor which can be stopped quickly by self braking action. A further object of this invention is to provide a novel alternating current commutator motor which can stop by itself braking action and can operate with either a series motor, shunt motor or a compound motor characteristic.

Figure 2:
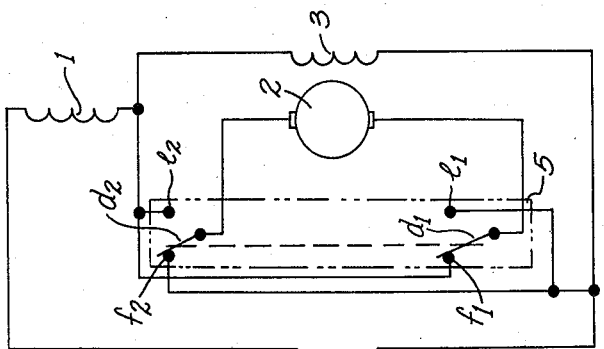
Figure 1:
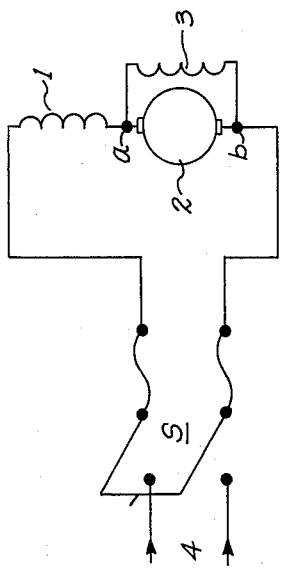

The features of the invention which are believed to be novel are set forth with particularity in the appended claims. The invention as well as further objects and advantages thereof may best be understood by reference to the following description taken in connection with the accompanying drawings, in which, FIG. 1 is a connection diagram showing a commutator motor of the simplest form embodying this inventon; and FIG. 2 shows a modification of FIG. 1 wherein a reversing switch is provided.

Throughout the drawings, the same numerals or reference characters represent the same or corresponding parts.

Briefly stated, this invention can be practiced by providing an alternating current commutator motor with a series winding and a shunt winding which is permanently connected across the armature of the motor so that it can function as a dynamic braking resistance to stop the motor quickly when it is disconnected from the source of electric supply. In order to provide a reversible commutator motor a suitable reversing switch is provided to reverse the connection of the armature.

According to another aspect of this invention the commutator motor is provided with a pair of field windings which are adapted to be slectively connected in series with the armature to provide reversible operation.

The motor is also provided with a switch for connecting the armature and one of the field windings in a closed circuit to provide quick brake.

By suitably combining this two winding commutator motor with appropriate change-over switches the motor can operate either as a series, shunt or compound motor with quick brake and in different directions at different speeds.

The present alternating current commutator motor comprising an armature with a series winding and a parallel connected controlling and braking coil is characterized in that it can effect speed control during operation to maintain at a very good condition its speed regulation due to load and that when the motor is disconnected from the source of supply said coil acts as a braking coil to instantly brake and stop the motor. When the motor is operating as a series motor with the series winding alone the controlling and braking force would not become effective but the speed regulation would be very large.

When the motor is to be stopped, it will of course be understood that the motor is quickly stopped by the braking action.

Referring now to the accompanying drawings, more particularly, to FIG. 1, the commutator motor of the instant invention has a series field winding 1, a commutator type armature 2 and a shunt winding 3 which is permanently connected across terminals $a$ and $b$ of the armature 2. The shunt winding 3 is also connected to produce a magnetic field which acts upon the armature commulatively with that produced by the series winding 1. The motor of this invention constructed as above can self start by closing a switch S to connect it to a suitable source 4 of A.C. When the switch S is opened the motor is stopped very quickly by the dynamic braking action provided by the closed circuit including the field coil 3 and the armature 2, which obviates the necessity of providing any additional braking means. While, as described above, the present motor can be stopped very quickly by the automatic braking action occurring upon opening of the switch S it will be understood to those skilled in the art that the relative magnitudes of the series field winding 1, armature 2 and shunt field winding 3 are suitably determined to suit particular application, in a manner similar to conventional matters. For instance, in the example given for a commutator motor to be used in an alternating current circuit, the ratio of impedances between armature 2 and shunt field winding 3 is selected to be about 1:1, and that between shunt field winding and series field winding to be about 7:3.

As will be clear from the above description the present motor not only can be stopped very quickly by self braking action occurring upon opening of the switch S but also has a partial compound characteristic so that its variation in speed due to change of load is small. Accordingly the present motor is quite suitable for use in such fields as sewing machines, automatic balancing devices or automatic regulators. FIG. 2 illustrates a modification wherein a change-over switch 5 is added to operate the armature 2 either in the forward or in the reverse direction. The change-over switch 5 has a pair of movable contacts $d1$ and $d2$ which are arranged such that the direction of current flowing through the armature 2 can be reversed when they are thrown to terminals $f^1$ and $f^2$ and to terminals $e^1$ and $e^2$.

By interlocking this change-over switch 5 with said source switch S it is able to effect quick reversal of the motor as well as quick stopping of the armature 2, thus increasing advantage of the present motor in various applications above noted.

While my improved motor and change-over switch have been disclosed for the purpose of illustration and description, it is to be understood that various changes can be made without departing from the true spirit and scope of the invention, whereby it is intended to cover in the appended claims all such modifications as fall within the true spirit and scope of the invention.

What I claim as new and desire to secure by Letters Patent of the United States is:

1. A small alternating current commutator motor of the quick stop type comprising an armature having a commutator, a series winding connected in series with said armature, a switch in series with said series winding and armature and a shunt field winding connected across input terminals of said armature, the ratio of the impedance between said armature and shunt field winding being about 1 to 1 and that between said shunt field winding and series field winding being about 7 to 3.

2. A small alternating current commutator motor of the quick stop type comprising an armature having a commutator, a series winding connected in series with said armature, a switch in series with said series winding and armature and a shunt winding adapted to be connected in parallel with said armature and a change-over switch for changing the polarity of said armature with respect to said series and shunt windings, the ratio of impedances between said armature and shunt field winding being about 1 to 1 and that between said shunt field winding and series field winding being about 7 to 3.

References Cited in the file of this patent

UNITED STATES PATENTS

| | | |
|---|---|---|
| 2,461,919 | Powell | Feb. 15, 1959 |
| 2,726,363 | Scully | Dec. 6, 1955 |
| 2,784,366 | Steele | Mar. 5, 1957 |

FOREIGN PATENTS

| | | |
|---|---|---|
| 155,815 | Australia | Mar. 23, 1954 |
| 171,350 | Great Britain | Feb. 9, 1922 |